United States Patent
Lende

(10) Patent No.: US 7,357,834 B2
(45) Date of Patent: Apr. 15, 2008

(54) CEMENT COMPOSITION FOR USE WITH A FORMATE-BASED DRILLING FLUID COMPRISING AN ALKALINE BUFFERING AGENT

(75) Inventor: Gunnar Lende, Sandnes (NO)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/279,361

(22) Filed: Apr. 11, 2006

(65) Prior Publication Data
US 2006/0169175 A1 Aug. 3, 2006

Related U.S. Application Data

(62) Division of application No. 10/886,761, filed on Jul. 8, 2004, now Pat. No. 7,059,408.

(51) Int. Cl.
 *C04B 24/16* (2006.01)
(52) U.S. Cl. .................. 106/726; 106/819; 106/823
(58) Field of Classification Search ............ 106/819, 106/823, 726
See application file for complete search history.

(56) References Cited

U.S. PATENT DOCUMENTS

| | | | |
|---|---|---|---|
| 2,805,719 A | 9/1957 | Anderson | |
| 3,499,491 A * | 3/1970 | Wyant et al. | 166/292 |
| 4,515,635 A | 5/1985 | Rao et al. | |
| 4,555,269 A | 11/1985 | Rao et al. | |
| 4,557,763 A * | 12/1985 | George et al. | |
| 4,674,574 A * | 6/1987 | Savoly et al. | 166/293 |
| 4,818,288 A | 4/1989 | Aignesberger et al. | |
| 5,028,341 A | 7/1991 | Liao | |
| 5,284,513 A * | 2/1994 | Cowan et al. | 106/790 |
| 5,309,999 A * | 5/1994 | Cowan et al. | 166/293 |
| 5,311,944 A * | 5/1994 | Cowan et al. | 166/292 |
| 5,339,899 A | 8/1994 | Ravi et al. | |
| 5,343,951 A * | 9/1994 | Cowan et al. | 166/293 |
| 5,346,012 A | 9/1994 | Heathman et al. | |
| 5,379,840 A * | 1/1995 | Cowan et al. | 166/292 |

(Continued)

OTHER PUBLICATIONS

Answer 7 of 23 Chemical Abstract from STN☐☐"Utilization of fly ash for construction materials", PL 179309 (abstract only) Aug. 31, 2000, Jarema-Suchorowska et al.*

(Continued)

*Primary Examiner*—Paul Marcantoni
(74) *Attorney, Agent, or Firm*—Craig W. Roddy; Conley Rose, P.C.

(57) ABSTRACT

A cement slurry comprising a base for reducing the impact of an alkaline solution may be displaced into a wellbore and allowed to set. The base may comprise a metal carbonate that is soluble in water such as potassium carbonate. The cement slurry may further include cement, water, and a salt that is soluble in the water such as potassium chloride. The alkaline solution may be present in a formate-based drilling fluid displaced into the wellbore ahead of the cement slurry. Despite being contacted by such an alkaline solution, the thickening time of the cement slurry is long enough and the set time is short enough to provide for the formation of an impermeable mass in the annulus of the wellbore. The thickening times may range from about 4 hours to about 16 hours, and the set times may be less than about 24 hours.

23 Claims, 4 Drawing Sheets

U.S. PATENT DOCUMENTS

| | | | |
|---|---|---|---|
| 5,421,409 A * | 6/1995 | Mueller et al. | 166/292 |
| 5,421,881 A * | 6/1995 | Rodrigues et al. | 106/809 |
| 5,536,311 A | 7/1996 | Rodrigues | |
| 5,547,506 A * | 8/1996 | Rae et al. | 106/730 |
| 6,173,778 B1 * | 1/2001 | Rae et al. | 166/293 |
| 6,231,664 B1 * | 5/2001 | Chatterji et al. | 106/724 |
| 6,315,061 B1 | 11/2001 | Boatman et al. | |
| 6,422,325 B1 | 7/2002 | Krieger | |
| 6,457,523 B1 | 10/2002 | Vijn et al. | |
| 6,554,069 B1 | 4/2003 | Chatterji et al. | |
| 6,562,122 B2 * | 5/2003 | Dao et al. | 106/705 |
| 6,613,142 B1 * | 9/2003 | D'Almeida et al. | 106/789 |
| 6,641,658 B1 * | 11/2003 | Dubey | 106/705 |
| 6,762,155 B2 | 7/2004 | Chatterji et al. | |
| 6,869,474 B2 * | 3/2005 | Perez Pena | 106/727 |
| 7,059,408 B2 | 6/2006 | Lende | |
| 2002/0162487 A1 * | 11/2002 | D'Almeida et al. | 106/789 |
| 2005/0155763 A1 * | 7/2005 | Reddy et al. | 166/295 |

OTHER PUBLICATIONS

Halliburton brochure entitled "CFR-3 Cement Friction Reducer Dispersant," dated 1998, pp. 1-2.
Halliburton brochure entitled "Halad® -344 Fluid-Loss Additive," dated 1998, pp. 1-2.
Halliburton brochure entitled "Halad® -600 E+ Fluid-Loss Additive," dated 1998, pp. 1-2.
Halliburton brochure entitled "HR® -5 Cement Additive," dated 1998, pp. 1-2.
Halliburton brochure entitled "NF-6 Defoamer," dated 1998, pp. 1-2.
Halliburton brochure entitled "SSA-1 Strength-Stabilizing Agent," dated 1998, pp. 1-2.
Halliburton brochure entitled "MICROSAND Cement Additive," dated 1999, pp. 1-2.
Halliburton brochure entitled "MICROMAX Weight Additive," dated 1999, pp. 1-2.
Halliburton brochure entitled "SCR-500L™ High-Temperature Retarder," dated 2000, pp. 1-2.
Office Action for U.S. Appl. No. 10/886,761 dated Mar. 14, 2006.
Office Action for U.S. Appl. No. 10/886,761 dated Oct. 19, 2005.

* cited by examiner

CEMENT COMPOSITION FOR USE WITH A FORMATE-BASED DRILLING FLUID COMPRISING AN ALKALINE BUFFERING AGENT

CROSS-REFERENCE TO RELATED APPLICATIONS

This is a Divisional Application of U.S. patent application Ser. No. 10/886,761, filed Jul. 8, 2004 now U.S. Pat. No. 7,059,408 and entitled "Methods of Reducing the Impact of a Formate-Based Drilling Fluid Comprising an Alkaline Buffering Agent on a Cement Slurry," which is hereby incorporated by reference herein in its entirety.

FIELD OF THE INVENTION

The present invention generally relates to well cementing, and more particularly to methods of cementing a wellbore using a cement slurry comprising a base for reducing the impact of a formate-based drilling fluid comprising an alkaline buffering agent on the cement slurry.

BACKGROUND OF THE INVENTION

Natural resources such as gas, oil, and water residing in a subterranean formation or zone are usually recovered by drilling a wellbore down to the subterranean formation while circulating a drilling fluid (also known as a drilling mud) through the drill pipe and the drill bit and upwardly through the wellbore to the surface. The drilling fluid serves to control the wellbore pressures, lubricate the drill bit and carry drill cuttings back to the surface. After the wellbore is drilled to the desired depth, the drill pipe and drill bit are typically withdrawn from the wellbore while the drilling fluid is left in the wellbore to provide hydrostatic pressure on the formation penetrated by the wellbore and thereby prevent formation fluids from flowing into the wellbore.

The next operation in completing the wellbore usually involves ruing a string of pipe, e.g., casing, in the wellbore. Primary cementing is then typically performed whereby a cement slurry is pumped down through the string of pipe and into the annulus between the string of pipe and the walls of the wellbore to allow the cement slurry to set into a hard mass, and thereby seal the annulus. The cement slurry ideally displaces the drilling fluid from the annulus. However, some intermixing usually occurs, and certain cement slurries are often incompatible with the components in certain drilling fluids.

Formate-based drilling fluids have emerged that can be used in a variety of applications such as for drilling and completing deep, high-temperature wells. Such fluids contain minimal solids and maintain Theological stability at relatively high temperatures. The formate-based drilling fluids typically comprise formate salts of alkali metals such as cesium formate and/or potassium formate, which are soluble in water. They advantageously form high-density brines, thus providing for good monitoring and control of the wellbore. In particular, the density of a formate-based drilling fluid can be varied depending on various factors. For example, a less dense fluid can be used to speed up drilling, or a more dense fluid can be used to prevent formation fluid from flowing into the wellbore when the formation fluid pressure is relatively high.

Due to its acidic nature, a formate-based drilling fluid is often buffered with an alkaline material such as a potassium carbonate to prevent corrosion and ensure that the fluid is chemically stable when used downhole. For example, a drilling fluid commonly used in preparing deep wellbores in the Norwegian Sea, which contains 784 $L/m^3$ of cesium formate brine and 132 $L/m^3$ of potassium formate brine, is commonly buffered with from about 2,000 to about 3,000 ppm of potassium carbonate.

Unfortunately, when a conventional cement slurry is pumped into a wellbore behind a drilling fluid buffered in this manner, it can be adversely affected by the alkaline material and the formate in the drilling fluid. For example, the alkaline material may cause the thickening time of the cement slurry to become unacceptably short for safe placement in the wellbore, or it can cause the cement slurry to attain a consistency at which it is unpumpable. As such, the drill pipe or the tool used to lower the piping in the wellbore may be cemented in place, causing several weeks of delay in the completion of the well. Attempts to reduce this effect on thickening time by including more set retarder than usual in the cement slurry may highly increase the time required for the slurry to develop a strength sufficient to form an impermeable solid. As a result of these problems, the cost of preparing the wellbore may be very high. A need therefore exists for methods of reducing the impact of an alkaline material and a formate compound present in a drilling fluid on a cement slurry while still achieving the desired strength for the cement within an acceptable amount of time.

SUMMARY OF THE INVENTION

In an embodiment, methods of cementing a wellbore include displacing a cement slurry comprising a base for reducing an impact of an alkaline solution and/or a formate compound into a wellbore and allowing the cement slurry to set. The base may comprise a metal carbonate that is soluble in water such as potassium carbonate. The cement slurry may further include cement, water, and a salt that is soluble in the water such as potassium chloride.

In another embodiment, cement compositions or slurries comprise a base for reducing the impact of an alkaline solution and/or a formate compound, which may be present in a drilling fluid, on the cement compositions. That is, the thickening times of the cement slurries are long enough and the set times are short enough to provide for the formation of impermeable masses in the annulus of a wellbore despite being contacted by such an alkaline solution and/or a formate compound. The thickening times may range from about 4 hours to about 16 hours, and the set times may be less than about 24 hours.

DETAILED DESCRIPTION OF THE PREFERRED EMBODIMENTS

Figure 1:
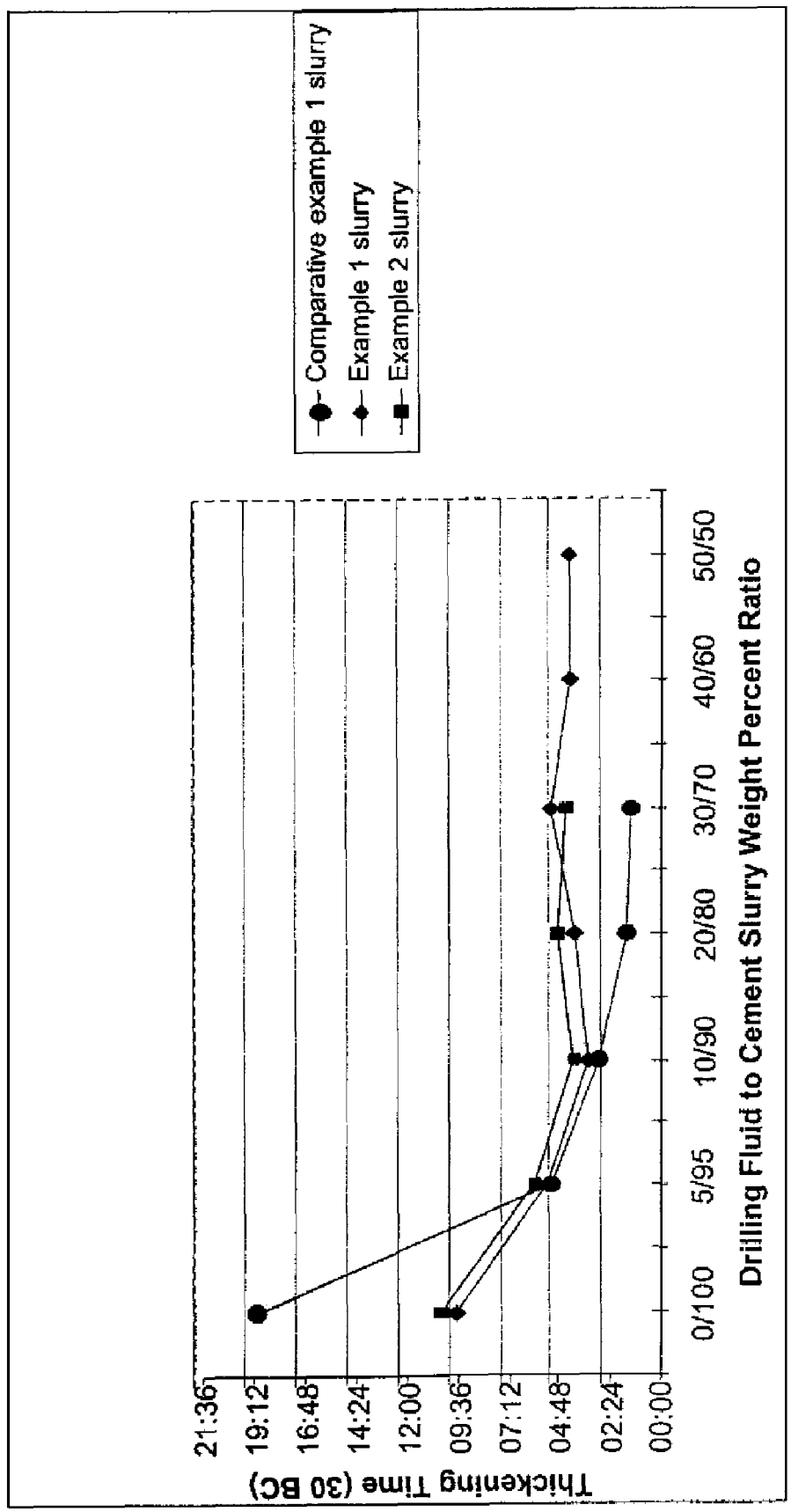
FIG. 1 is a graph plotting the thickening times of a conventional cement slurry and two cement slurries containing potassium carbonate as a function of the formate-based drilling fluid to cement slurry volume percent ratios.
Figure 2:
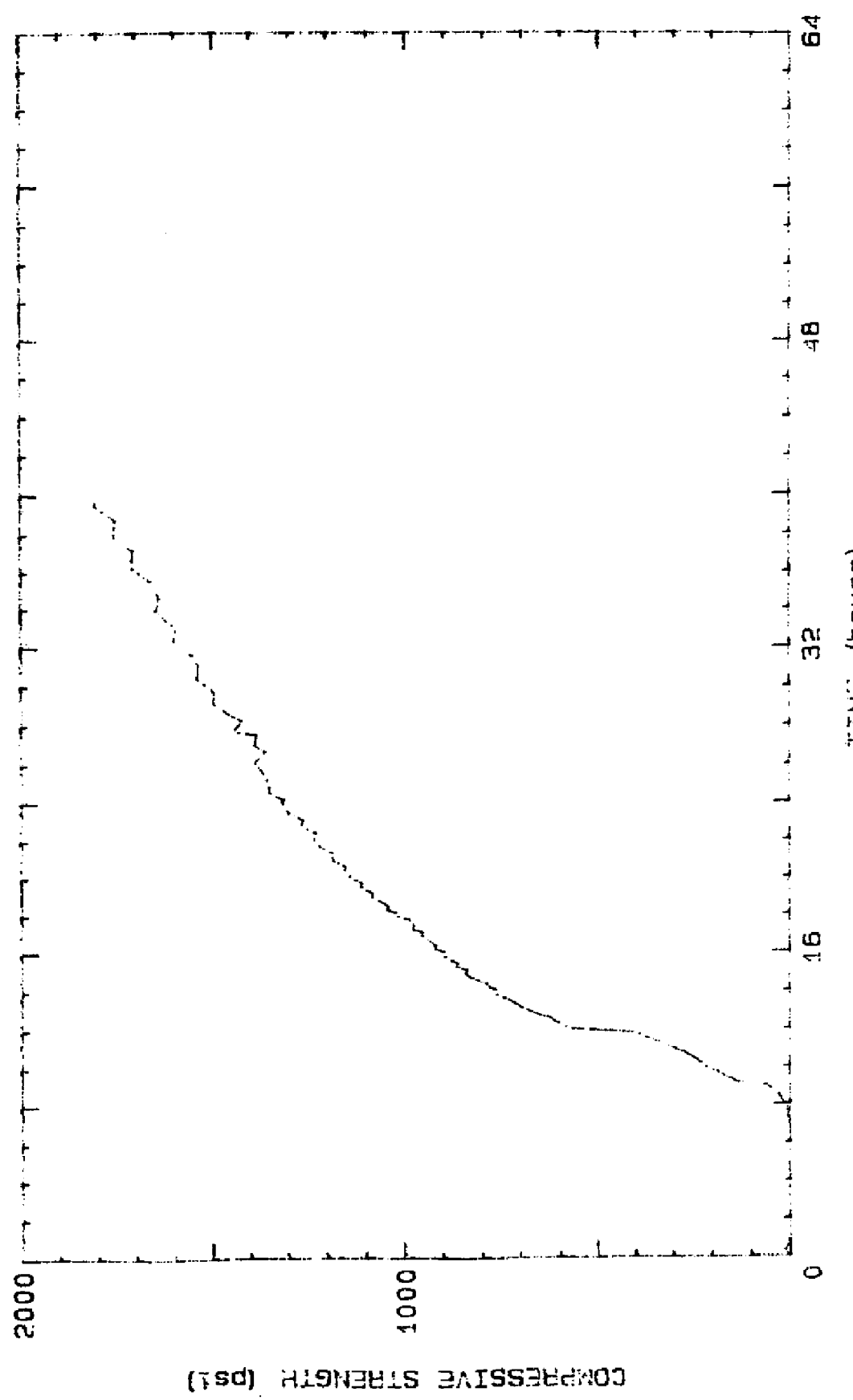
FIG. 2 is a graph of the compressive strength of a cement slurry comprising potassium carbonate and potassium chloride as a function of the curing time of the cement slurry.

At least one base may be included in cement compositions or slurries for reducing an impact of an alkaline (i.e., basic) solution and/or a metal formate compound on those compositions. The alkaline solution may be used as a buffering agent in a drilling fluid, also known as a drilling mud, containing at least one formate brine such as cesium formate and potassium formate brines. A buffering agent is a substance that, when added to a solution, resists a change in hydrogen ion concentration that otherwise would be caused by the presence of an acid or an alkali (i.e., a base) in the solution. Formate-based drilling fluids are commonly buffered with potassium carbonate.

As used herein, "base" refers to a compound that yields hydroxyl ions in aqueous solution such that the solution has a pH greater than about 7. An effective amount of the base may be present in the cement compositions to give the compositions a pH in a range of from about 10 to about 12, alternatively from about 10.5 to about 11. The base is preferably soluble in water contained in the cement compositions. As such, the base may be dissolved in the water. Otherwise, the base may not successively prevent the undesired results discussed above. In an embodiment, the amount of the base present in the cement compositions may be in a range of from about 0.1% to about 10% by weight of the cement (bwoc), alternatively from about 0.1% to about 5% bwoc. Examples of suitable bases include but are not limited to a metal carbonate that is soluble in water, a metal hydroxide that is soluble in water, or combinations thereof. The base may be, for example, potassium carbonate, sodium carbonate, potassium hydroxide, sodium hydroxide, or combinations thereof.

The cement compositions further include cement such as hydraulic cement, which includes calcium, aluminum, silicon, oxygen, and/or sulfur and which sets and hardens by reaction with water Examples of hydraulic cements include but are not limited to a Portland cement, a pozzolan cement, a gypsum cement, a high alumina content cement, a silica cement, a high alkalinity cement, or combinations thereof The cement may be, for example, a class A, B, C, G, or H Portland cement. A preferred cement is a class G cement. A sufficient amount of water is also added to the cement to form a pumpable cementitious slurry. The water may be fresh water or salt water, e.g., an unsaturated aqueous salt solution or a saturated aqueous salt solution such as brine or seawater.

The cement compositions may also contain at least one salt that is soluble in the water contained in the compositions. In an embodiment, the salt is incapable of forming a reaction product that is insoluble in the water. Otherwise, a precipitate could form in the water that could undesirably alter the properties of the cement compositions. For example, the presence of precipitated particles in the cement compositions could increase their viscosities such that they are more difficult to pump. Examples of suitable salts include but are not limited to potassium chloride, sodium chloride, or combinations thereof An amount of the salt present in the cement compositions may be in a range of from about 0% to about 10% bwoc, alternatively from about 0.1% to about 5% bwoc.

A preferred material for use in the cement compositions is commercially available from Halliburton, Inc. under the tradename FDP-C707-03 solution. This material is an aqueous solution comprising both potassium carbonate (i.e., the base) and potassium chloride (i.e., the salt). An amount of this material present in the cement compositions may be in a range of from about 0% to about 50% bwoc, alternatively from about 0.1% to about 20% bwoc.

The cement compositions may further include one or more cement retarders to adjust the thickening time to enable such compositions to be properly placed in the wellbore. Due to the presence of the base in the cement compositions, more retarder may be added without being concerned that the compressive strengths of those compositions might take too long to develop. In an embodiment, the cement retarder is a synthetic cement retarder such as a copolymer of 2-acrylamido-2-methylpropanesulfonic acid and itaconic acid known as SCR-500 retarder, which is commercially available from Halliburton Energy Services, Inc. The amount of the SCR-500 retarder present in the cement compositions may be in a range of from about 0% to about 10% bwoc, alternatively from about 4% to about 6%. An aqueous solution containing 20% SCR-500 retarder by weight of the solution is also commercially available from Halliburton Energy Services, Inc. under the tradename SCR-500L. In another embodiment, the cement retarder is a lignosulphonate known as HR-5L retarder, also commercially available from Halliburton Energy Services, Inc. The amount of the HR-5L retarder present in the cement composition may be in the range of from about 0% to about 10% bwoc, alternatively from about 2% to about 6% bwoc. In yet another embodiment, the cement composition may comprise both SCR-500L retarder and HR-5L retarder.

The cement compositions may additionally include a gel modifier. As used herein, "gel modifier" refers to a material that is capable of reducing the amount of gelation in a cement composition, wherein the gel modifier preferably maintains the pumpability of the cement composition as it passes through a wellbore to the annulus despite the presence of a base in the cement composition that could otherwise cause the cement composition to gel and become difficult to pump. In an embodiment, the gel modifier is an acrylic polymer in an aqueous solution known as HALAD 600LE+ fluid loss control agent, which is commercially available from Halliburton Energy Services, Inc. The amount of the HALAD 600LE+ fluid loss control agent present in the cement compositions may be in a range of from about 0% to about 20% bwoc, alternatively from about 4% to about 12%. In another embodiment, the gel modifier is HALAD-344 fluid loss control agent, which is also an acrylic polymer in an aqueous solution that is commercially available from Halliburton Energy Services, Inc. The amount of the HALAD-344 fluid loss control agent present in the cement compositions may be in a range of from about 0% to about 30% bwoc, alternatively from about 0% to about 15%.

As deemed appropriate by one skilled in the art, additional additives may be added to the cement compositions for improving or changing the properties thereof Examples of such additives include but are not limited to fluid loss control agents, defoamers, dispersing agents, weighting agents, anti-gas migration agents, and formation conditioning agents. Such cement compositions may be made by any suitable method known to those of skill in the art.

The foregoing cement compositions may be made by combining all of the components in any order and thoroughly mixing the components in a manner known to one skilled in the art. In an embodiment, the cement compositions are prepared shortly before being pumped downhole, e.g., in a range of from about 25 minutes to about 2 hours before being pumped, thus ensuring that they do not age before being placed downhole. Such aging could adversely affect their properties.

Methods of cementing a wellbore using one of the foregoing cement compositions first involve drilling the wellbore to a desired depth such that the wellbore penetrates a subterranean formation or zone. A formate-based drilling fluid buffered with an alkaline solution may be circulated through the wellbore as it is being drilled. In an embodiment, the drilling fluid may be of the type commonly used for drilling in the Norwegian Sea, which contains cesium formate, potassium formate, and potassium carbonate as a buffering agent. Subsequent to drilling the wellbore, at least one conduit such as a casing or drill string may be placed in the wellbore while leaving a space known as the annulus between the wall of the conduit and the wall of the wellbore. The drilling fluid may then be displaced down through the conduit and up through the annulus one or more times, for example, twice, to clean out the hole. The cement composition or slurry then may be conveyed downhole and up through the annulus, thereby displacing the drilling fluid from the wellbore. The cement composition is allowed to set into a substantially impermeable mass that isolates the wellbore and provides support to the adjacent conduit, e.g., casing. The cement composition may also be employed in subsequent secondary operations. For example, it may be used to plug or otherwise isolate zones through which fluid can undesirably migrate in the wellbore. Such zones may be present in, for example, the subterranean formation and the cement column formed in the annulus. Examples of such zones include a fissure, a crack, a fracture, a streak, a flow channel, a void, a perforation formed by a perforating gun, a permeable matrix, sand combinations thereof.

The presence of the base in the cement composition most likely reduces the impact of the contamination of the alkaline solution and/or the metal formate in the drilling fluid on the cement composition. When the cement composition contacts the drilling fluid downhole, the effect of the alkaline solution on the composition is weakened since the composition already comprises an alkaline solution. In particular, the thickening time and the set time of the cement composition are affected less by the exposure to the additional alkaline solution and/or metal formate, resulting in a less expensive cementing process as described below. As used herein, "thickening time" refers to the duration that a cement composition remains in a fluid state such that it is capable of being pumped downhole, and "set time" refers to the duration required for a newly formed cement composition to harden into a solid that is impermeable to fluids and that preferably has a compressive strength greater than or equal to about 500 psi. The thickening time of the cement composition is reduced to a lesser extent, or not at all, by contact with the drilling fluid as compared to a cement composition containing no base. In an embodiment, the thickening time is improved by an amount in a range of from about 30% to about 100% when the base is included in the cement composition. As such, the thickening time remains sufficiently long to allow the cement composition to be placed in the annulus, thus avoiding problems that could otherwise delay the completion of the wellbore such as the cementing of a drill pipe in the wellbore. In an embodiment, the thickening time is in a range of from about 4 hours to about 16 hours, alternatively from about 6 hours to about 13 hours. Moreover, the set time of the cement composition is also affected to a lesser extent, or not at all, by contact with the drilling fluid as compared to a cement composition containing no base. As such, larger amounts of cement retarder may be used in the cement composition without risking undue delay in the development of its compressive strength. In embodiments, the set time is less than about 24 hours, less than about 16 hours, or less than about 8 hours.

EXAMPLES

The invention having been generally described, the following examples are given as particular embodiments of the invention and to demonstrate the practice and advantages hereof It is understood that the examples are given by way of illustration and are not intended to limit the specification or the claims to follow in any manner.

Example 1

A drilling fluid comprising cesium formate and potassium formate and buffered with about 1,700-2,000 ppm potassium carbonate was used to drill the 8 ½" section of a high pressure-high temperature (HPHT) well. The wellbore had a bottom hole static temperature (BHST) of about 173° C. and a bottom hole circulating temperature (BHCT) of about 150° C. A cement slurry was prepared by adding the materials shown in Table 1 to fresh water as it was being pumped into a wellbore. Those materials included class G cement, the FDP-C707-03 solution containing potassium carbonate and potassium chloride, the HALAD 600LE+ fluid loss control agent (i.e., the gel modifier), and the SCR-500L retarder. The cement slurry was pumped down a drill pipe and into the annulus where it was allowed to set after pulling the drill pipe out of the wellbore. In conjunction with this procedure, laboratory testing was conducted as follows. The thickening times of the cement slurry required to achieve 30 Bearden units of consistency (BC), 70 BC, and 100 BC were determined in accordance with American Petroleum Institute (API) Specification 10B, 22nd Edition, 1997. Further, the compressive strength of the cement slurry over time was determined using an Ultrasonic Compressive Analyzer (UCA) as described in the previously mentioned API reference. In addition, the following measurements were taken in accordance with the previously mentioned API reference: the amount of free water in the cement slurry, FANN 35 viscometer dial readings at 30° C., the gel strength, and the fluid loss at 95° C. A British Petroleum (BP) settling test was also performed on the cement slurry. The results of these tests are shown in Table 2 below.

TABLE 1

| | Cement Slurry Component | Supplier | Concentration |
|---|---|---|---|
| Slurry Design | Class G cement | — | Concentrations of other components were based on the weight of the cement |
| | SSA-1 strength retainment additive | Halliburton | 35.0% bwoc |

TABLE 1-continued

| Cement Slurry Component | Supplier | Concentration |
|---|---|---|
| CFR-3L dispersant | Halliburton | 2.0 L/100 kg |
| Microsilica liquid | Halliburton | 14.0 L/100 kg |
| MICROMAX weighting agent | Halliburton | 55.0% bwoc |
| SCR-500L retarder | Halliburton | 24.0 L/100 kg* |
| HALAD 600LE+ fluid loss control agent | Halliburton | 8.0 L/100 kg |
| FDP-C707-03 solution | Halliburton | 3.5 L/100 kg |
| NF-6 anti-foamer | Halliburton | 0.1 L/100 kg |
| Fresh water | — | 17.3 L/100 kg |
| Total Mix Fluid | | 80.34 L/100 kg |
| Yield | | 124.70 L/100 kg |

*Equivalent to 4.8% bwoc

TABLE 2

| Property | Measurement | Unit |
|---|---|---|
| Thickening time at 150° C. (drilling fluid to cement slurry weight percent ratio = 0) | | |
| Time to 30 BC | 10:30 | hrs.:mins. |
| Time to 70 BC | 10:50 | hrs.:mins. |
| Time to 100 BC | 10:51 | hrs.:mins. |
| Vertical free water | 0 | % by volume of slurry |

TABLE 2-continued

| Property | Measurement | Unit |
|---|---|---|
| Specific gravity, top/bottom | 2.15/2.15 | |
| BP settling test, deviation/avg. | −1.1/+1.3 | |
| FANN viscometer readings at 30° C. | 248 | centipoise at 300 rpm |
| | 200 | centipoise at 200 rpm |
| | 121 | centipoise at 100 rpm |
| | 82 | centipoise at 60 rpm |
| | 50 | centipoise at 30 rpm |
| | 19 | centipoise at 6 rpm |
| | 14 | centipoise at 3 rpm |
| Gel strength, 10 sec./10 min. | 5/24 | lbs/100 ft² |
| Fluid loss at 95° C. | 22 | cc/30 min. |
| UCA compressive strength | 500 | psi at 16 hrs. |
| | 1,880 | psi at 24 hrs. |

Example 2

The procedure and associated laboratory testing described in Example 1 was repeated with the exception that the cement slurry contained larger amounts of FDP-C707-03 solution and thus larger amounts of potassium carbonate base and potassium chloride, and less water. The relative amounts of each component in the cement slurry and the results of the tests that were performed are shown in Tables 3 and 4 below, respectively.

TABLE 3

| | Cement Slurry Component | Supplier | Concentration |
|---|---|---|---|
| Slurry Design | Class G cement | — | Concentrations of other components were based on the weight of the cement |
| | SSA-1 strength retainment additive | Halliburton | 35.0% bwoc |
| | CFR-3L dispersant | Halliburton | 2.0 L/100 kg |
| | Microsilica liquid | Halliburton | 14.0 L/100 kg |
| | MICROMAX weighting agent | Halliburton | 55.0% bwoc |
| | SCR-500L retarder | Halliburton | 24.0 L/100 kg* |
| | HALAD 600LE+ fluid loss control agent | Halliburton | 8.0 L/100 kg |
| | FDP-C707-03 solution | Halliburton | 5.0 L/100 kg |
| | NF-6 anti-foamer | Halliburton | 0.1 L/100 kg |
| | Fresh water | — | 16.01 L/100 kg |
| Total Mix Fluid | | | 80.55 L/100 kg |
| Yield | | | 124.91 L/100 kg |

*Equivalent to 4.8% bwoc

TABLE 4

| Property | Measurement | Unit |
|---|---|---|
| Thickening time at 130° C. (drilling fluid to cement slurry weight percent ratio = 0) | | |
| Time to 30 BC | 11:04 | hrs.:mins. |
| Time to 70 BC | 11:14 | hrs.:mins. |
| Time to 100 BC | 11:19 | hrs.:mins. |
| Vertical free water | 0 | % volume of slurry |
| Specific gravity, top/bottom | 2.15/2.15 | |
| BP settling test, deviation/avg. | −1.1/+1.3 | |
| FANN viscometer readings at 30° C. | 248 | centipoise at 300 rpm |
| | 200 | centipoise at 200 rpm |
| | 121 | centipoise at 100 rpm |
| | 82 | centipoise at 60 rpm |
| | 50 | centipoise at 30 rpm |

TABLE 4-continued

| Property | Measurement | Unit |
|---|---|---|
| | 19 | centipoise at 6 rpm |
| | 14 | centipoise at 3 rpm |
| Gel strength, 10 sec./10 min. | 5/24 | lbs/100 ft$^2$ |
| Fluid loss at 95° C. | 22 | cc/30 min. |
| UCA compressive strength | 200 | psi at 16 hrs. |
| | 500 | psi at 24 hrs. |

Comparative Example 1

The laboratory tests described in Example 1 were performed on a conventional cement slurry having no FDP-C707-03 solution with potassium carbonate and potassium chloride was used as a control. Also, this slurry did not contain the Halad-600LE+ fluid loss control agent as a gel modifier. The relative amounts of each component in the cement slurry, and the results of the tests that were performed are shown in Table 5 and 6 below, respectively.

The laboratory tests performed in Comparative Example 1 and in Examples 1 and 2 above were repeated using different formate-based drilling fluid to cement slurry volume percent ratios (based on the total volume of the drilling fluid and the cement slurry). FIG. 1 depicts the thickening time of each cement slurry at 30 BC as a function of those ratios. The thickening time of the conventional cement slurry immediately dropped to below that of the base-containing slurries as the amount of drilling fluid was increased. It even dropped to and leveled off at less than about 2 hours. However, the thickening time of each base-containing slurry dropped to and leveled off at about 5 hours as the drilling fluid to cement slurry weight percent ratio increased. As such, the thickening times of the new cement slurries were sufficient to permit those slurries to be pumped into the annulus of the wellbore.

Figure 3:
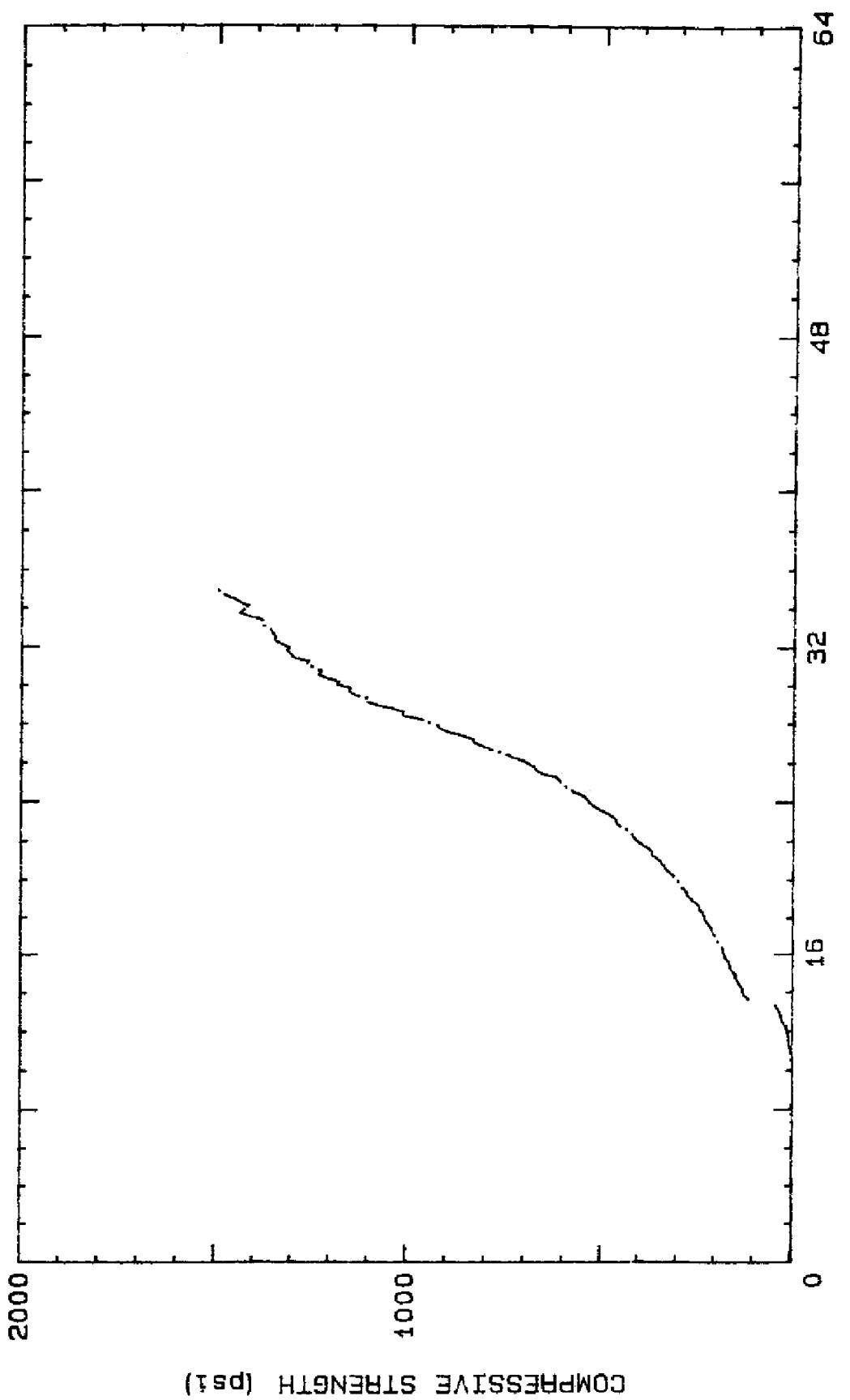
FIG. 3 is a graph of the compressive strength of another cement slurry comprising larger quantities of potassium carbonate and potassium chloride as a function of the curing time of the cement slurry.
Figure 4:
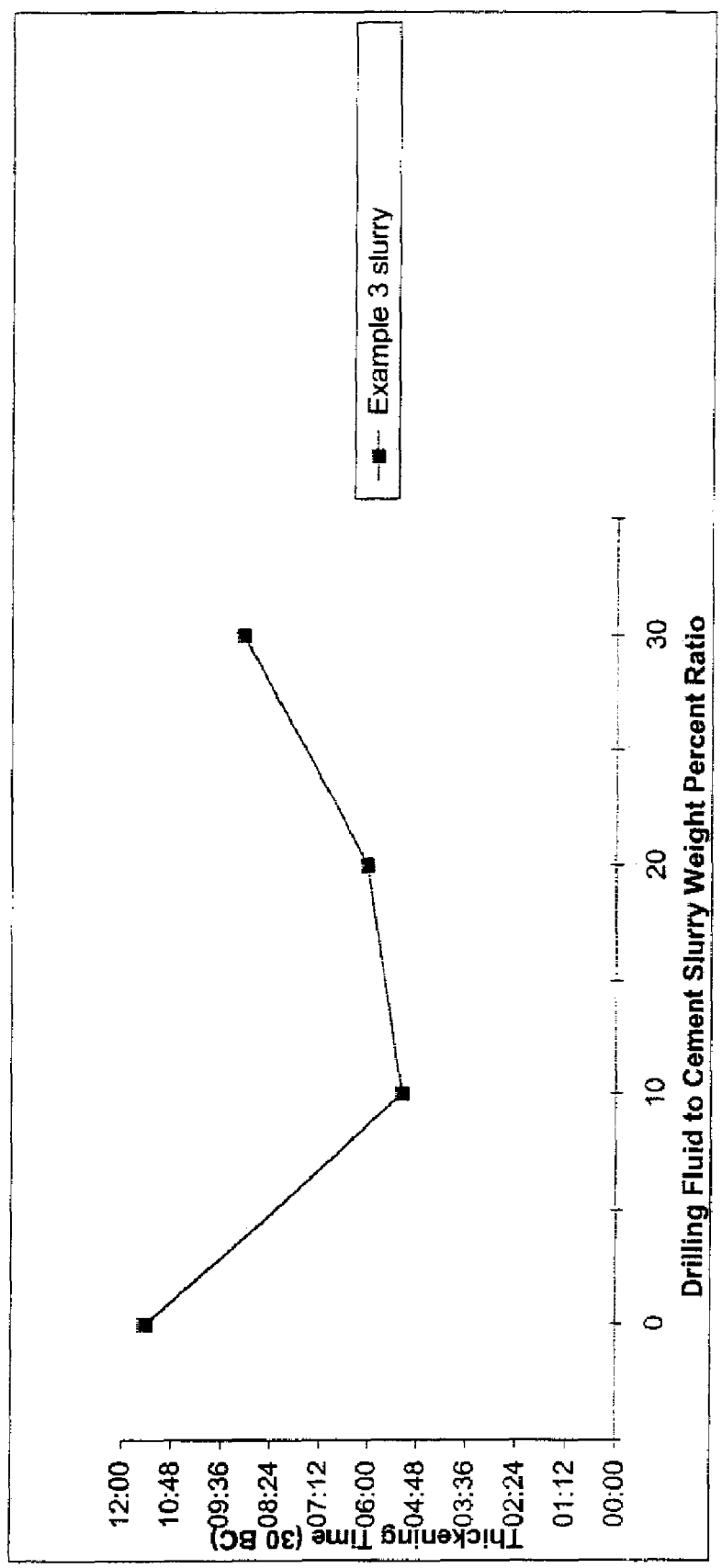
FIG. 4 is a graph plotting the thickening time of a cement slurry containing potassium carbonate and a lingo retarder as a function of the formate-based drilling fluid to cement slurry volume percent ratios.

Furthermore, the compressive strengths of the base-containing cement slurries used in Examples 1 and 2 were plotted as a function of time in FIGS. 3 and 4, respectively.

TABLE 5

| | Cement Slurry Component | Supplier | Concentration |
|---|---|---|---|
| Slurry Design | Class G cement | — | Concentrations of other components were based on the weight of the cement |
| | SSA-1 strength retainment additive | Halliburton | 35.0% bwoc |
| | CFR-3L dispersant | Halliburton | 0.75 L/100 kg |
| | Microsilica liquid | Halliburton | 16.0 L/100 kg |
| | MICROMAX weighting agent | Halliburton | 55.0% bwoc |
| | SCR-500L retarder | Halliburton | 7.20 L/100 kg |
| | HALAD 413L fluid loss control agent | Halliburton | 8.0 L/100 kg |
| | FDP-C707-03 solution | Halliburton | none |
| | NF-6 anti-foamer | Halliburton | 0.1 L/100 kg |
| | Fresh water | — | 25.80 L/100 kg |
| Total Mix Fluid | | 65.13 L/100 kg | |
| Yield | | 109.50 L/100 kg | |

TABLE 6

| Property | Measurement | Unit |
|---|---|---|
| Thickening time at 130° C. (drilling fluid to cement slurry weight percent ratio = 0) | | |
| Time to 30 BC | 19:04 | hrs.:mins. |
| Time to 70 BC | 19:09 | hrs.:mins. |
| Time to 100 BC | 19:10 | hrs.:mins. |
| Vertical free water | 0 | % by volume of slurry |
| Specific gravity, top/bottom | 2.13/2.16 | |
| BP settling test, deviation/avg. | −2.1/+3.2 | |
| FANN viscometer readings | 175 | centipoise at 300 rpm |
| at 30° C. | 122 | centipoise at 200 rpm |
| | 65 | centipoise at 100 rpm |
| | 40 | centipoise at 60 rpm |
| | 21 | centipoise at 30 rpm |
| | 5 | centipoise at 6 rpm |
| | 3 | centipoise at 3 rpm |
| Gel strength, 10 sec./10 min. | 4/6 | lbs/100 ft$^2$ |
| Fluid loss at 95° C. | 26 | cc/30 min. |
| UCA compressive strength | 0 | psi at 16 hrs. |
| | 300 | psi at 24 hrs. |

The compressive strengths of the slurries increased sharply in a relatively short period of time such that they set into impermeable masses capable of isolating a subterranean formation from the wellbore in which they reside. The control cement slurry also set in a similar fashion but at a much later stage as expected with the longer thickening time. In addition, the base-containing cement slurries exhibited less fluid loss and greater gel strength values than did the control cement slurry.

Example 3

The procedure described in Example 1 was repeated with the exception that the cement slurry contained an HR-5L lignosulphonate retarder in addition to the SCR-500L retarder, a slightly smaller amount of FDP-C707-03 solution, and thus smaller amounts of potassium carbonate base and potassium chloride, and less water. The relative amounts of each component in the cement slurry and the results of the tests that were performed are shown in Tables 7 and 8 below, respectively.

TABLE 7

| | Cement Slurry Component | Supplier | Concentration |
|---|---|---|---|
| Slurry Design | Class G cement | — | Concentrations of other components were based on the weight of the cement |
| | SSA-1 strength retainment additive | Halliburton | 35.0% bwoc |
| | CFR-3L dispersant | Halliburton | 2.0 L/100 kg |
| | Microsilica liquid | Halliburton | 14.0 L/100 kg |
| | MICROMAX weighting agent | Halliburton | 55.0% bwoc |
| | SCR-500L retarder | Halliburton | 24.0 L/100 kg* |
| | HALAD 600LE+ fluid loss control agent | Halliburton | 8.0 L/100 kg |
| | FDP-C707-03 solution | Halliburton | 3.0 L/100 kg |
| | NF-6 anti-foamer | Halliburton | 0.1 L/100 kg |
| | HR-5L lignosulphonate retarder | Halliburton | 2.0 L/100 kg |
| | Fresh water | — | 15.96 L/100 kg |
| Total Mix Fluid | | | 124.9 L/100 kg |
| Yield | | | 80.5 L/100 kg |

*Equivalent to 4.8% bwoc

TABLE 8

| Property | Measurement | Unit |
|---|---|---|
| Thickening time at 130° C. (drilling fluid to cement slurry weight percent ratio = 0) | | |
| Time to 30 BC | 13:25 | hrs.:mins. |
| Time to 70 BC | 13:52 | hrs.:mins. |
| Time to 100 BC | 13:59 | hrs.:mins. |
| Specific gravity, top/bottom | 2.15/2.15 | |

The procedure followed in Example 3 above was repeated using different formate-based drilling fluid to cement slurry volume percent ratios (based on the total volume of the drilling fluid and the cement slurry). FIG. 4 depicts the thickening time of each cement slurry at 30 BC as a function of those ratios. The thickening time of the base-containing slurry initially dropped as the drilling fluid to cement slurry volume percent ratio was increased from 0 to about 10. Then the thickening time increased from about 5 minutes to about 9 minutes as the drilling fluid to cement slurry volume percent ratio was increased up to 30. Therefore, longer contaminated thickening times can be achieved by introducing both a base and a lignosulphonate retarder to cement slurries.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein

What is claimed is:

1. A well servicing cement composition comprising:
   (i) Portland cement;
   (ii) water;
   (iii) an alkaline solution;
   (iv) a base; and
   (v) a retarder;
   wherein the alkaline solution comprises a formate; wherein the retarder comprises a copolymer of 2-acrylamido-2-methylpropanesulfonic acid.

2. The cement composition of claim 1, wherein an amount of the base present in the cement composition is effective to obtain a thickening time in a range of from about 4 hours to about 16 hours.

3. The cement composition of claim 1, wherein the base comprises a metal carbonate that is soluble in the water, a metal hydroxide that is soluble in the water, or combinations thereof.

4. The cement composition of claim 1, wherein the base comprises potassium carbonate, sodium carbonate, potassium hydroxide, sodium hydroxide, or combinations thereof.

5. The cement composition of claim 1, further comprising a salt that is soluble in the water and that is incapable of forming a reaction product that is insoluble in the water with the base.

6. The cement composition of claim 5, wherein the salt comprises potassium chloride, sodium chloride, or combinations thereof.

7. The cement composition of claim 1, wherein an amount of the base present is in a range of from about 0.1% to about 10% by weight of the cement.

8. The cement composition of claim 1, wherein an amount of the base present is in a range of from about 0.1% to about 5% by weight of the cement.

9. The cement composition of claim 5, wherein an amount of the salt present is in a range of from about 0% to about 10% by weight of the cement.

10. The cement composition of claim 5, wherein an amount of the salt present is in a range of from about 0.1% to about 5% by weight of the cement.

11. The cement composition of claim 1, wherein the retarder further comprises an itaconic acid, a lignosulphonate, or combinations thereof.

12. The cement composition of claim 1, wherein an amount of the retarder present is in a range of from greater than 0% to about 10% by weight of the cement.

13. The cement composition of claim 1, further comprising a gel modifier in a range of from about 0% to about 20% by weight of the cement.

14. The cement composition of claim 1, having a thickening time in a range of from about 6 hours to about 13 hours.

15. The cement composition of claim 1, having a set time of less than about 24 hours.

16. The cement composition of claim 1, having a set time of less than about 16 hours.

17. The cement composition of claim 1, having a set time of less than about 8 hours.

18. The cement composition of claim 1, further comprising a reaction product of the base and the alkaline solution.

19. The cement composition of claim 1, wherein the alkaline solution comprises a drilling fluid.

20. The cement composition of claim 1, wherein the formate comprises cesium formate, potassium formate, or combinations thereof.

21. The cement composition of claim 19, wherein the drilling fluid comprises potassium carbonate.

22. The cement composition of claim 18, wherein the reaction product is formed in situ within a wellbore.

23. A well servicing cement composition comprising:
 (i) cement;
 (ii) water;
 (iii) an alkaline solution;
 (iv) a base; and
 (v) a retarder;
 wherein the alkaline solution comprises a formate; wherein the retarder comprises a copolymer of 2-acrylamido-2-methylpropanesulfonic acid; and wherein the cement consists of a Portland cement.

* * * * *